Feb. 25, 1936.   N. P. HARSHBERGER   2,031,950
BUILDING MATERIAL
Filed Oct. 23, 1931

INVENTOR.
Norman P. Harshberger
BY
Morsell & Morsell
ATTORNEYS.

Patented Feb. 25, 1936

2,031,950

UNITED STATES PATENT OFFICE 2,031,950

BUILDING MATERIAL

Norman P. Harshberger, Scarsdale, N. Y., assignor to Bakelite Building Products Co. Inc., New York, N. Y., a corporation of Delaware Application October 23, 1931, Serial No. 570,677

12 Claims. (Cl. 72—18)

This invention relates to improvements in building material and method of manufacturing the same.

It is the present practice, when it is desired to manufacture colored, rigid building material, to mix together the principal ingredients, such as cement and asbestos fibers, and to also add the desired coloring material. The resulting mixture may then be made into the form of a web, the latter cut into units of desired size, and each unit subjected to great hydraulic pressure resulting usually in units of sheet-like character commonly between ⅛" and 1" thick. Before the product is suitable for use, however, it must be permitted to cure for about six weeks' time, and this necessity for curing is objectionable where color has been used, in view of the fact that a certain chemical reaction usually takes place between the coloring material and the other ingredients during the curing, which results in a more or less streaked appearance of the finished article.

It is one of the objects of the present invention to provide an improved method of manufacturing colored building material, which obviates the above mentioned objectionable feature.

A more specific object of the invention is to provide a method of manufacturing building material wherein the color is added in a novel manner after the material has been thoroughly cured.

A still more specific object of the invention is to provide a method wherein the principal ingredients are so molded or formed as to produce a plurality of relatively deep depressions throughout the surface thereof, and in which the material thus formed is permitted to cure, and in which other material having a contrasting color, is then added to fill up or partially fill the depressions.

A further object of the invention is to provide an improved method of manufacturing building material which consists in forming a plurality of depressions in the surface thereof, the said depressions facilitating curing by making it possible for air to more quickly affect the interior of the material, the result being equalized and more thorough curing. With the ordinary asbestos shingle, however, wherein there are no air cells or depressions, the curing is not thorough or equalized, and expansion and contraction, as a result of temperature changes, occurs when the elements are assembled on a roof, this expansion and contraction causing the exposed ends to curl.

A further object of the invention is to provide rigid building material having a plurality of depressions in the surface thereof wherein said depressions are filled with other material having a contrasting appearance.

A further object of this invention is to provide building material which is well adapted for use in connection with the covering of roofs, floors, sides of buildings and the like, and in connection with the construction of walls.

A further object of the invention is to provide building material which is relatively simple in construction, strong and durable, pleasing in appearance, and well adapted for the purposes described.

With the above and other objects in view, the invention consists of the improved building material and method of manufacturing the same, and all its parts and combinations as set forth in the claims, and all equivalents thereof.

In the accompanying drawing in which the same reference numerals designate the same parts in all of the views:

Fig. 2 is an enlarged fragmentary sectional view showing material which contrasts in color, poured into the depressions on one side;

Fig. 3 is a similar view of the finished product showing the added material scraped off and filling the holes on both sides;

Fig. 4 is a fragmentary perspective view showing a modified form of construction before the depressions have been filled;

Fig. 5 is a similar view showing the depressions as they appear when other material of contrasting color is positioned therein;

Fig. 6 is a perspective view on a smaller scale showing a modified form of element; and Fig. 7 is a sectional view taken on line 7—7 of Fig. 6.

Figure 1:
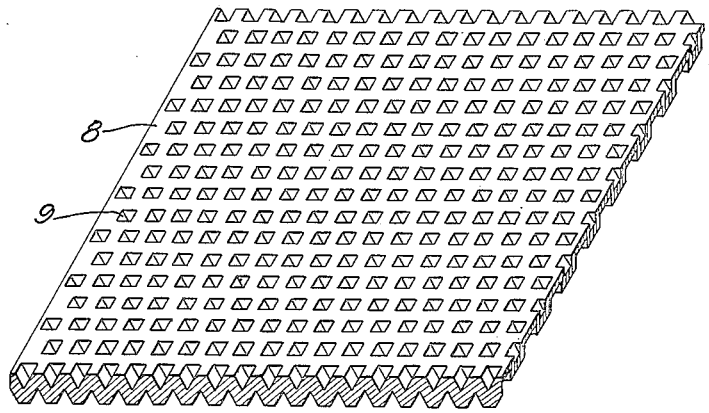
Fig. 1 is a perspective view showing the improved material before the depressions have been filled.
Figure 1:
Figure 1:
Figure 1:
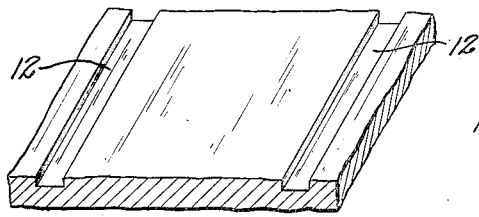
Figure 1:
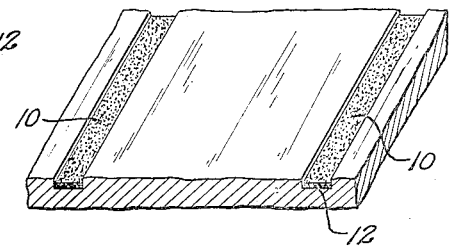
Figure 1:
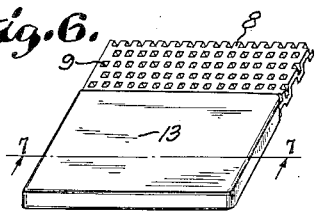
Figure 1:
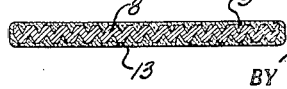

Referring to the drawing, the base 8 is composed of suitable fibers mixed with a binder. The binder is preferably hydraulic cement, but it may be asphalt or some cellulose material. The fibers are preferably asbestos fibers. These principal ingredients are mixed together while the binder is in a liquid or semiliquid state, and are then poured into a suitable mold or otherwise formed to desired shape to form building elements of a desired size and configuration usually units of sheet-like character commonly between ⅛" and 1" thick. If a mold is utilized, it is so constructed as to create a plurality of relatively deep depressions 9 in one or both surfaces of the product.

These depressions may be of any shape but it will be understood from the drawing that they are preferably of cellular or pit-like character and that their size will be dependent upon the particular features of the invention desired, and upon the thickness of the element. For instance as illustrated, they are square on top and substantially V-shaped in cross section. The V-shaped arrangement is desirable, in view of the fact that it permits the use of depressions on both sides of the product which can be offset from one another as shown in Fig. 3, to permit making the depressions relatively deep without unduly weakening the material and as shown to obtain a substantially uniform wall thickness. It is also preferred that the depressions be arranged relatively close together, preferably in rows with the distance between depressions in a row and between rows of depressions substantially equal to the depth of the depressions as shown.

If the product is not formed by molding, the depressions may be created by pressure or in any other suitable manner after the composition has nearly hardened. The pressure may be applied either to cut units or to a web.

The base thus formed is then permitted to cure for the necesasry length of time. Due to the fact that the depressions each extend a relatively great distance into the material from both sides thereof, air can necessarily reach the interior of the product, and thorough and equalized curing can be effected in considerably less than normal time.

When the product has been thoroughly cured, the holes are filled in any desired manner with a suitable filler such as an emulsified asphalt. The filler may also consist of cement containing a pigment such as a metal oxide and a chloride which, when mixed in suitable proportions, form the desired color. If desired, the pigment may be omitted and a filler material only utilized, the said filler usually being of contrasting appearance from the base. The filling material after it has been poured over the product, will probably take the form shown in Fig. 2 wherein it is designated by the numeral 10. It is then preferably scraped off, and both sides are filled to produce a finished product having the appearance shown in Fig. 3. This will result in a contrast between the portions 11 of the base, and the filling material 10 within the depressions. It is also possible to utilize granulated cork, which has excellent insulating qualities, or any other desired material together with a suitable binder for filling the depressions.

If desired, the cured base may be additionally hardened and strengthened by applying in the depressions a suitable hardening chemical. This may be done prior to the application of the filling material.

The resulting product will, from a distance, create the same impression as though the entire element were colored with the material used in the depressions. This is due to the fact that the depressions are relatively close together, and to the fact that from a distance the color in the depressions seems to merge to give a solid appearance.

In the form of the invention illustrated in Figs. 4 and 5, the base may be formed of similar materials as the base of Fig. 1, and the depressions may be elongated and spaced apart as at 12. These depressions may also be formed by molding, or by pressure. A suitable filler, which may be the same as the filler described in connection with the principal form, may then be utilized to either partially or completely fill the grooves or depressions 12. The result will be definition lines of contrasting appearance from the main body of the element to give a shingle-like effect from a distance.

In the form of the invention illustrated in Figs. 6 and 7, an element formed of a base like that shown in Fig. 1 is used, and said base is dipped into a suitable coating material 13 which may also contain color, the said coating completely covering both surfaces as well as the edges of the dipped portion. It is preferred to leave a part of the element uncoated as shown, and this part, which is adapted to be overlapped in assembly, will have great insulating value due to the plurality of uncovered air cells formed by the depressions 9. Also in assembly where the cells are staggered and positioned substantially adjacent the exposed portion as shown, they form a barrier resisting creepage of moisture beyond the butt edge of the covering element.

By use of the above methods, the danger of discoloration or streaking which is present when coloring material is made a part of the original mixture, is eliminated. Furthermore, a process has been described whereby only one type of composition need be mixed to form the base, in view of the fact that the same type of base may be used to produce roofing of various color effects, by merely adding the desired coloring material to the filler for the depressions. It is further to be seen that the use of the relatively deep depressions forms a means for firmly anchoring the filler and coloring material in position.

Although only a few forms of the invention have been shown and described, it is obvious that various modifications and adaptations may be devised, and it is to be understood that all such changes are contemplated as may come within the scope of the claims.

What I claim is:

1. As a new article of manufacture, building material comprising a rigid cementitious base having a plurality of surface depressions therein, coating material entirely covering a portion of said base, and another portion which is adapted to be overlapped in assembly being uncovered, the depressions in said uncovered portion forming air cells to aid in insulation.

2. As an article of manufacture a rigid building element comprising a preformed rigid sheet-like base, a plurality of individual disconnected cavities having converging walls, arranged in rows with the cavities in a row substantially regularly spaced and the cavities in adjacent rows in offset relation and a continuous layer of surfacing material on said base and filling said cavities to form a color facing therefor.

3. A roofing element comprising a composition base, having its surface portion which is to be covered when laid in overlapping courses presenting a plurality of juxtaposed disconnected depressions arranged in rows in offset relation and positioned substantially adjacent the surface portion to be exposed, said depressions forming a barrier to creepage of moisture beyond the butt edge of overlapping elements when laid and forming air cells to aid in insulation.

4. A sheet-like building element comprising a composition base, a plurality of disconnected depressions forming air cells arranged in rows over said base, and having a depth substantially one-half the thickness of the base, the distance between cells in a row and between rows of cells being substantially the depth of the depressions, and there being depressions on the opposed faces of said element and said depressions being in staggered relation with each other to obtain substantially uniform wall thicknesses to provide means for substantially equalized curing of the elements.

5. A composition building element comprising a preformed sheet-like base of substantially uniform thickness between its opposed faces, a plurality of individual disconnected pit-like cavities intimately arranged in staggered relation over the opposed faces thereof, the cavities being of such shape and depth as to form a section through the depressions of substantially uniform wall thickness and to expose a greater interior surface area at each face than that surrounding the cavities, said cavities permitting aeration of the interior of the element to effect uniform curing of the inner and outer portions thereof.

6. A building element for covering exterior and interior surfaces comprising a preformed sheet-like base including cement and fibre, and having a plurality of juxtaposed disconnected cellular depressions therein, a portion of said base to be exposed when laid presenting a surface ornamenting addition anchored to the base and of a contrasting color to the base material, and other portions of said base comprising air cells of the cellular depressions, said cellular depressions aiding in curing of the base during manufacture and said air cells aiding in the surface insulation when the element is laid.

7. As a new article of manufacture, building material comprising a preformed sheet-like rigid base, a plurality of substantially regularly interspaced cellular depressions in the face portion thereof to be exposed in assembly, arranged in rows with adjacent depressions substantially regularly positioned and in offset relation with depressions in adjacent rows, and filler material contrasting in light effect with the base secured in said depressions, said depressions arranged sufficiently close together whereby an illusory light effect substantially similar to that of the filler material is created over the surface of the element when viewed from a distance.

8. As a new article of manufacture, a substantially thin sheet-like section of a web comprising hydraulic cement, said section including a plurality of interspaced cellular depressions being arranged in rows with adjacent depressions in a row and in adjacent rows substantially regularly positioned and with the depressions in adjacent rows in offset relation, said depression being substantially V-shaped and of substantial depth and arranged sufficiently close together to expose a considerable portion of the interior of the sheet without substantial weakening thereof as an aid in curing of the product without the application of heat.

9. As a new article of manufacture, a substantially rigid sheet-like section of cementitious building material, said section including a plurality of juxtaposed depressions covering a substantial portion of the opposed faces thereof, said depressions being substantially staggered and regularly positioned and those on one face being offset with respect to the depressions upon the other, and said depressions being of such depth whereby substantially equalized curing of the inner and outer portions of the product may be obtained during aeration, and curling thereof be substantially prevented.

10. As a new article of manufacture a sheet-like cementitious section embodying the features recited in claim 9 wherein the depressions are inwardly tapered to prevent undue weakening of the product.

11. As a new article of manufacture a sheet-like cementitious section embodying the features recited in claim 9, wherein sufficient depressions of the cured product include material of contrasting appearance from the material of the section to obtain an illusory light effect of said material over said product.

12. As an article of manufacture, a building element for roof and wall covering comprising a preformed sheet-like base, a plurality of individual disconnected depressions in staggered relation and substantially uniformly spaced over the face thereof and a cork filler secured in said depressions, said depressions arranged sufficiently close together that said filler forms a product with substantial insulation properties.

NORMAN P. HARSHBERGER.